(No Model.)
E. M. DRISCOLL.
Carriage Bow.
No. 232,601. Patented Sept. 28, 1880.
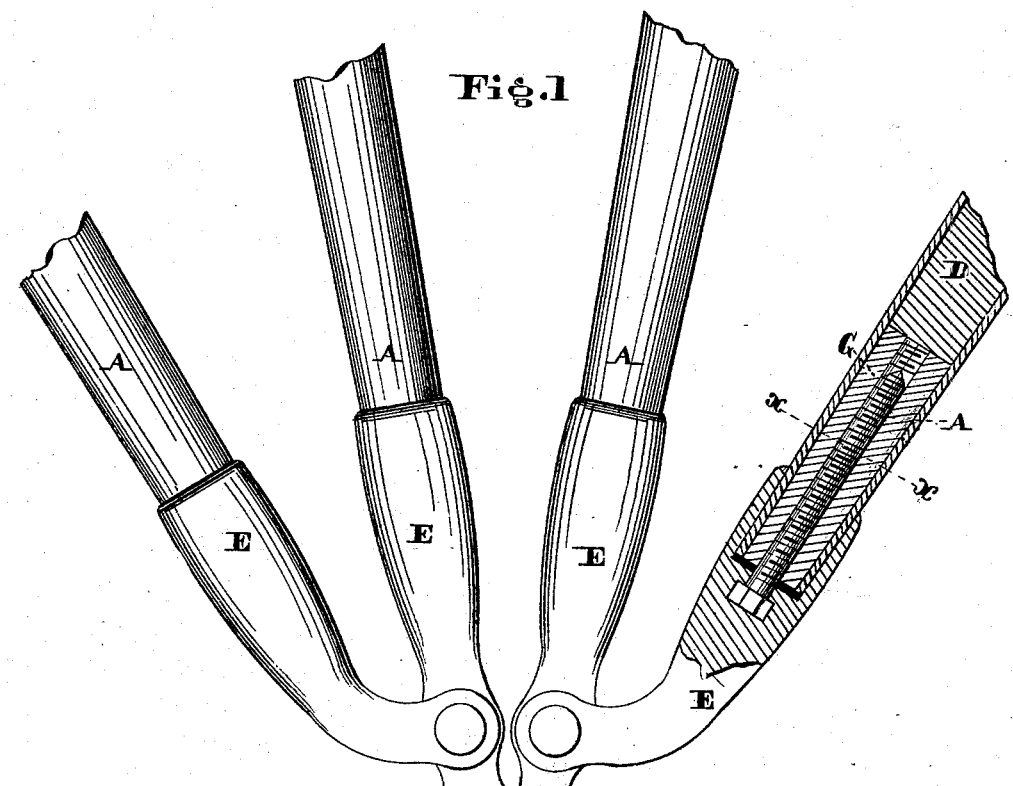

UNITED STATES PATENT OFFICE.

EDWARD M. DRISCOLL, OF CINCINNATI, OHIO.

CARRIAGE-BOW.

SPECIFICATION forming part of Letters Patent No. 232,601, dated September 28, 1880.

Application filed May 3, 1880. (No model.)

*To all whom it may concern:*

Be it known that I, EDWARD M. DRISCOLL, of Cincinnati, Hamilton county, Ohio, have invented a new and useful Improvement in Carriage-Bow Covers and Slat-Irons, of which the following is a specification.

The objects of my improvements are, first, to provide a smooth even joint in the bow-covering, and avoid the necessity of welding or soldering the seam and afterward dressing it off when so united, or of rolling the seam down upon a grooved mandrel when the ordinary sheet-metal lock-joint is made; second, of providing a secure means of uniting the bow to the socket or slat-iron.

In the accompanying drawings, in which like parts are represented by the similar letters in the different views, Figure 1 is a side elevation of a set of slat-irons and bows, the latter broken away at the top and one of the sockets and bows shown in section. Fig. 2 is an enlarged transverse sectional view taken in line $x\ x$ of Fig. 1; and Fig. 3 is a perspective view of the tapered nut or tapped plug which fills the lower end of the bow-cover and is to receive the screw in the socket or slat-iron.

The bow-cover A is made of tapered strips of sheet metal in the following manner: The edges are given a sharp bend in a bending-machine and hooked under. The strips are then bent to a tubular shape upon a mandrel. A key-piece, B, of the same length of the tube or cover, has its opposite edges turned over to enter the opposite hooked edges of the bow-cover A. This is slipped within the tube, as shown in Fig. 2, and holds the edges firmly together. C is a tapering nut, made to closely fit the lower end of the bow-cover, into which it is placed from the top, and pushed down to its place by the bow D, which has been previously formed of a size and shape to fit the tapered tube A upon a shaping-machine.

The socket-piece or slat-iron E, I make, preferably, of cast metal, molded with a screw, F, fixed centrally within the socket and projecting beyond the socket-piece to enter the nut C in the lower end of the bow-cover, so that by turning the slat-iron the lower filled end of the bow-cover is drawn within the socket in the slat-iron, thus avoiding the necessity of welding or soldering the parts together, and making a much stronger joint.

In place of the threaded plug C a smaller metal nut may be let into the lower end of the bow D to receive the screw F. A strong joint is also made if the nut and plug be omitted and the screw F driven into the lower end of the wooden bow, which in this case is extended down to near the end of the tube A.

The screw F may, if desired, be made long enough to extend through the nut C and enter the lower end of the bow to hold it firmly within the tube.

I claim—

1. A carriage-bow sheathed with a sheet-metal bow-cover, which is constructed with hooks extending radially inward from the tubular portion at sharp angles, and united by a key-piece, which fits a groove in the bow and draws the radial sides of the hooks close together, all substantially as before set forth, whereby the sheathed bow is formed with a continuous smooth surface without a break at the joint of the cover.

2. The slat-iron E, having a socket at its upper end to receive the lower end of a carriage-bow, and a screw, F, secured centrally within said socket, in combination with a carriage-bow of the character described.

3. The combination, substantially as specified, of slat-iron E, having screw F, with a metal-covered carriage-bow and threaded plug, C.

EDWARD M. DRISCOLL.

Witnesses:
ED. DEWALD,
GEO. J. MURRAY.